US012685273B2

(12) United States Patent
McGrath et al.

(10) Patent No.: US 12,685,273 B2
(45) Date of Patent: Jul. 21, 2026

(54) PROGRAMMABLE DRIP IRRIGATION EMITTER DEVICE

(71) Applicants: Donald T. McGrath, Colorado Springs, CO (US); Louis Price, Colorado Springs, CO (US); Sachinkumar Pandya, Colorado Springs, CO (US); Alberto Jose Acin Martinez, Colorado Springs, CO (US)

(72) Inventors: Donald T. McGrath, Colorado Springs, CO (US); Louis Price, Colorado Springs, CO (US); Sachinkumar Pandya, Colorado Springs, CO (US); Alberto Jose Acin Martinez, Colorado Springs, CO (US)

( * ) Notice: Subject to any disclaimer, the term of this patent is extended or adjusted under 35 U.S.C. 154(b) by 226 days.

(21) Appl. No.: 18/661,664

(22) Filed: May 12, 2024

(65) Prior Publication Data

US 2024/0381818 A1      Nov. 21, 2024

Related U.S. Application Data

(60) Provisional application No. 63/467,479, filed on May 18, 2023.

(51) Int. Cl.
*A01G 25/02*      (2006.01)

(52) U.S. Cl.
CPC ................................. *A01G 25/023* (2013.01)

(58) Field of Classification Search
CPC ............................. A01G 25/023; B05B 15/00
See application file for complete search history.

(56) References Cited

U.S. PATENT DOCUMENTS

2010/0200676 A1*   8/2010   Allen ................... A01G 25/023
                                                               239/542
2016/0219803 A1*   8/2016   Keren ........................ B05B 1/30
2019/0313590 A1*  10/2019   Wlassich ............... A01G 25/16
2020/0187434 A1*   6/2020   Roide ................... A01G 29/00

* cited by examiner

*Primary Examiner* — Phutthiwat Wongwian
*Assistant Examiner* — Jacek Lisowski
(74) *Attorney, Agent, or Firm* — Sam Pierce

(57)                    ABSTRACT

According to an aspect of the present invention disclosed herein, there is provided a programmable drip irrigation emitter device, comprising: an input port; a gathering chamber; a flow selection knob; an orifice sized to deliver the desired flow rate of water; one or more output ports; an output distribution chamber, wherein the water is splashed against the chamber surface while being redirected and channeled to pass through several diffusor pin arrays used to achieve nearly uniform water flow rate at the output ports; and an external case comprised of a top piece and a bottom piece.

7 Claims, 2 Drawing Sheets

PROGRAMMABLE DRIP IRRIGATION EMITTER DEVICE

BACKGROUND

The present invention is in the field of drip irrigation systems and methods.

Relevant prior art includes U.S. Pat. No. 5,609,303 which discloses a regulated flow restrictor device particularly useful as a drip irrigation emitter includes a housing having a flow-restrictor passageway formed with baffles defining clearances with the passageway walls, which clearances, by the displacement of a deformable elastomeric membrane, regulate the fluid flow through the passageway in response to variations in the pressure of the fluid. The clearances are of increasing height from one end of the passageway towards the other end such that the clearances are sequentially closed with increasing pressure at the housing inlet to maintain a substantially uniform flow through the housing outlet despite variations in the inlet pressure.

US20230270059 discloses an apparatus to regulate flow of an irrigation fluid through a drip irrigation device. The apparatus includes a fluid supply conduit, a rigid insert mounted coaxially within the fluid supply conduit, and at least one elastomeric ring. The rigid insert receives the fluid from a fluid supply at an inlet port and guides the fluid from the inlet port toward an outlet port. The at least one elastomeric ring is stretched over a portion of the rigid insert having a plurality of inflow gates inbuilt circumferentially into the rigid insert, where an elastomeric ring creates an inward pressure on each inflow gate that is lesser than an input pressure of the fluid. As a result, the flow of the liquid through a plurality of outlet perforations is regulated.

However, the prior art is lacking in at least in terms of precision and flexibility.

SUMMARY OF INVENTION

Therefore, according to an aspect of the present invention disclosed herein, there is provided a programmable drip irrigation emitter device, comprising: an input port; a gathering chamber; a flow selection knob; an orifice sized to deliver the desired flow rate of water; one or more output ports; an output distribution chamber, wherein the water is splashed against the chamber surface while being redirected and channeled to pass through several diffusor pin arrays used to achieve nearly uniform water flow rate at the output ports; and an external case comprised of a top piece and a bottom piece.

DETAILED DESCRIPTION

Figure 1:
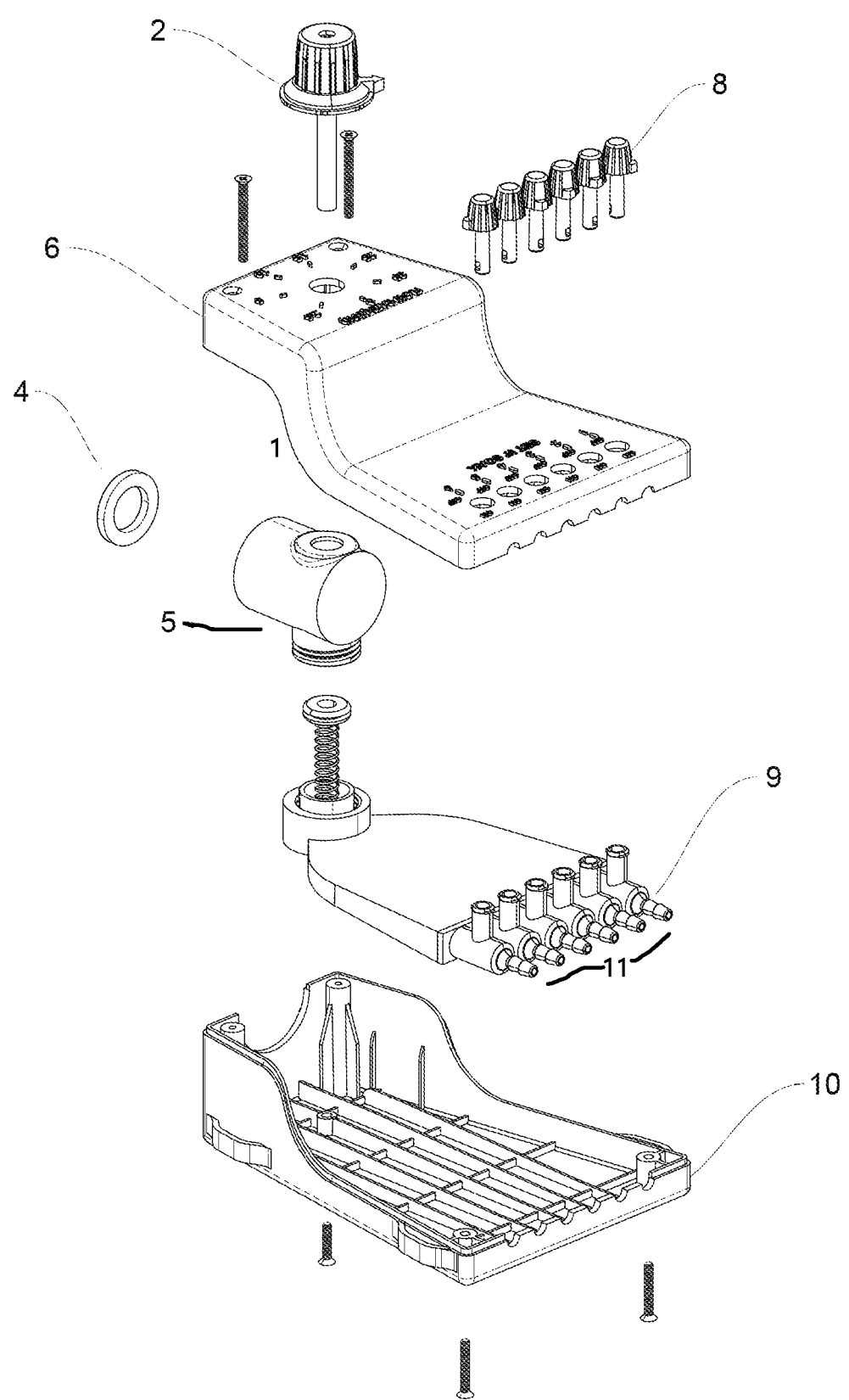
FIG. 1 is an exploded view of the programmable emitter device according to an embodiment of the present invention.

A typical drip system consists of a water pressure source, typically regulated to between 10 and 50 psi (pounds per square inch) of water pressure, controlled by an electrically controlled valve feeding a polyethylene drip line hose (typically ½" or ¾" in diameter), which is partially or fully buried and runs to and past the various trees, shrubs, or plants (referred to as plants from now forward) to be watered.

At each plant there are a number of traditional drip emitters, which output a somewhat constant flow of water when the control valve is open. These emitters come in discrete flow rates, with the most common being 0.5, 1, 2 and 5 gallons per hour (gph). Typically, ¼" drip line hose is used to carry water from the emitters to the plant. The amount of water delivered to each plant is set by the time the valve is on multiplied by the number and flow rates for the emitter at the plant. In testing systems with various flow rates, we have found the resulting flow rate can actually vary significantly, up to +/−40% due to the emitters not delivering truly constant flow.

There are usually multiple separate drip lines (zones) in a residential or commercial drip irrigation system, with the valve on each zone controlled separately by a controller (sometimes called the clock) that regulates the time each zone is turned on each day.

There are some regions where the electronic controller is replaced by the user manually turning the water on. In these cases, the remainder of the system is the same.

The problem with existing systems is that any one zone has on it a number of trees and plants that have differing water requirements. With the only control factors being the time water pressure is applied to the zone and the flow rate set at each tree or plant set by the combination of traditional fixed flow rate emitters, it is not possible to get the proper amount of water to each plant without over-watering or under-watering some plants on the line. These system require significant compromises be made, resulting in some trees/plants being over or underwatered as well as wasted water.

In a typical drip line scenario, there can be many trees and plants of various varieties on a single drip line. The amount of water delivered to any given plant is calculated as:

$$\text{Water volume delivered} = (\text{sum of emitter flow rates at plant}) \times \text{number of hours valve is open.}$$

For example, if a certain plant has two 1 gph emitters and the controller has the control valve open on its zone for one hour three days a week, the plant will get 2 gallons of water on each of those days for a total of 6 gallons per week.

The problem is that watering demands for planted trees and plants vary greatly over time as well as from tree to tree and plant to plant. For example, 9-11 foot *Ponderosa* pines require 25-30+ gallons per day for the 1st 2 weeks after planting and then 5-15 gallons 2-3 times a week depending on soil response afterward.

It is not uncommon to have dozens of trees which can easily cost thousands of dollars each to purchase and get planted, and trees can span a large physical area making individual care impractical.

Irrigation watering zones often contain many different types of plants with very different watering needs, but all on the same watering time schedule.

Current solutions to this involve manually adding and capping drip emitters as demands change which is inconvenient and also these emitters tend to leak, come out, or fail resulting in additional maintenance labor and wasted water.

Supplemental watering using garden hoses or bags is even more inconvenient and adjustable emitters that are manual are not accurate or repeatable.

Therefore, the present invention is a device that can be substituted in place of traditional discrete drip emitters that can be programmed to have a wide range of flow rates, which allows orders of magnitude more flexibility in getting the optimal amount of water to each plant on the drip system Embodiments of the present invention will be described with reference to the following drawings.

FIG. 1 is an exploded view of the programmable emitter device according to an embodiment of the present invention.

Water comes in through the input port on the left into a gathering chamber 1, which includes a rubber washer 4 for leak prevention.

The flow rate is set by the flow selection knob 2 to achieve the desired flow rate.

Water passes through the selected orifice 5, sized to deliver the desired flow rate.

The water then travels down a gathering chamber 1 into the output distribution chamber 9, where it splashed against the chamber surface while being redirected and channeled to pass through several diffusor pin arrays 11 used to achieve nearly uniform water flow rate at the output ports.

The gathering chamber and distribution chamber are encased in an external case comprised of a top piece 6 and a bottom piece 10, held together with various screws and sealing grommets.

The output ports are enabled or disabled with port selection knobs 8.

In order to achieve the characteristics described in the solution above, there is significant invention and fluid dynamics engineering required. These are summarized below.

In order to create the desired flow rates with the accuracy desired, the water at the input port is passed through one or more orifices sized to deliver those flow rates.

A selection knob is used to unblock the orifice ports to provide the desired output flow rates.

Since the water exiting the orifice outputs comes out with very high velocity, a gathering chamber is required to collect the water and minimize the momentum of the water, allowing even flow to the channel leading to the output ports.

The water then goes to a gradually tapered channel leading to the output ports.

In the tapered path, the water is further shaped by arrays of posts in the flow path, which further unifies the water flow, resulting in a very uniform pressure and flow at the output ports. Water enters the output chamber with various velocities, yet is smoothed out by the diffuser pin arrays, yielding very uniform flow at the output ports.

Due to the pressure drop within the device, the output flow rate is made less sensitive to the input pressure, allowing more constant output flow rate over varying input pressures. This also allows the device to be deployed on long drip line systems that have varying line pressure along the length of the line, while maintaining relatively constant output flow rate.

Figure 2:
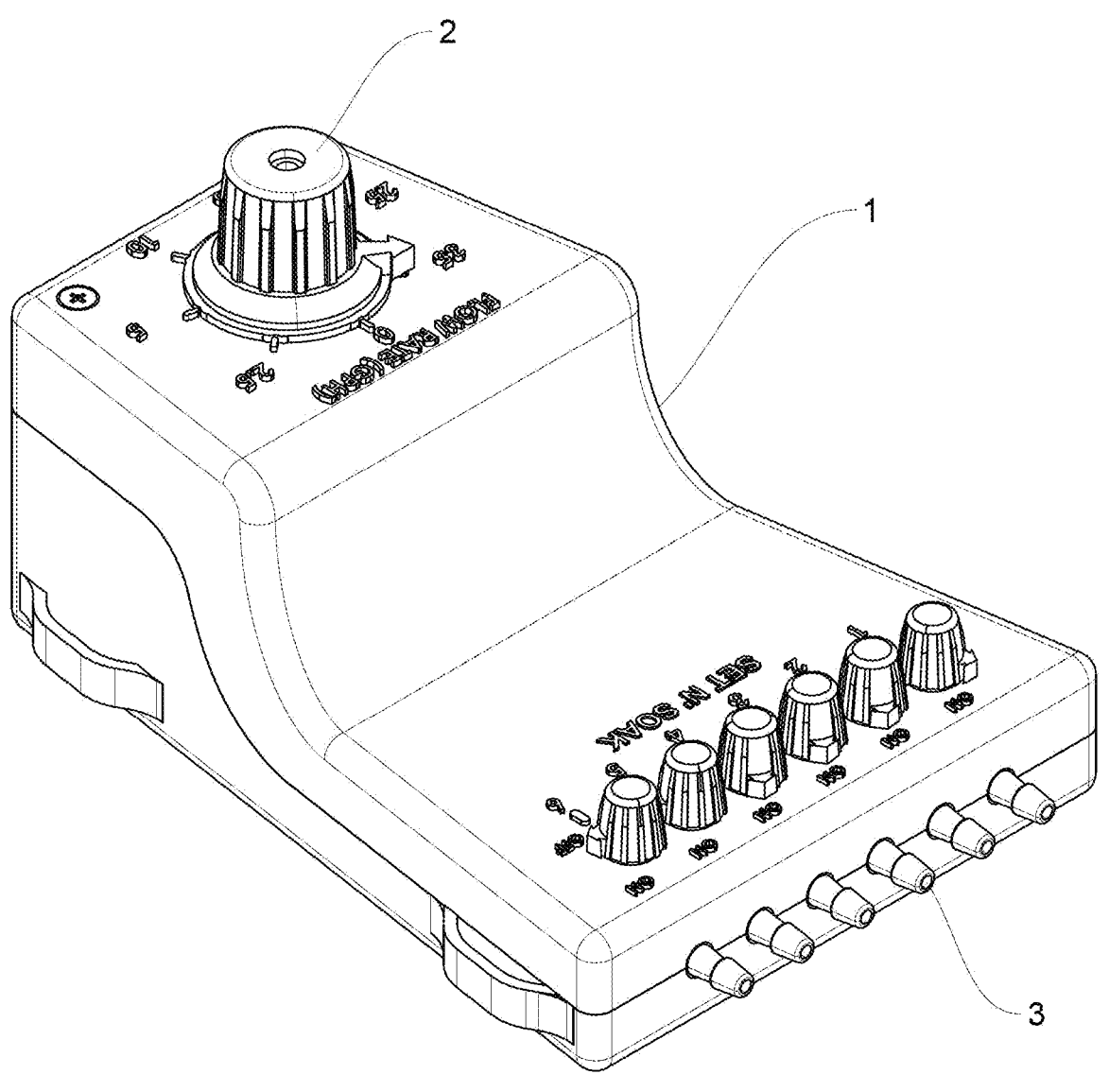
FIG. 2 is an illustration of the assembled programmable emitter device according to an embodiment of the present invention.

FIG. 2 is an illustration of the assembled programmable emitter device according to an embodiment of the present invention.

The water comes into the input port of device 1 through an input hose. The water is distributed to plants and trees through drip tubing attached to the output ports.

Water comes in through the input port on the left and the flow rate is set by the flow selection knob 2 to achieve flow rates ranging from 0 gph to 35 gph.

Water comes out at the selected flow rate from the output ports 3 on the right, which accommodate ¼" drip tubing. The number of ports is selectable from 1 to 6, with the desired flow rate being divided nearly equal among these ports. For example, if a flow rate of 10 gph is selected and 5 ports are turned on, there will be 2 gph output at each of the 5 enabled output ports.

In order to provide the accurate flow rates desired, water entering the device under a wide range of pressures (10-50 psi typically), can first undergo pressure regulation or compensation, which is accomplished with a water pressure regulator.

The flow selection knob may have as many settings as desired.

The flow selection knob may be replaced by other selection means such as push buttons or even an electronically controlled mechanism.

There can be fewer or more output ports, as desired.

The input port can be designed to accommodate any physical connection desired, such as ½" coupler or any other design.

The input and output port orientations can be designed to be in any orientation desired, such as on the same side or any other configuration desired.

The output port control knobs may be replaced by other selection means such as push buttons or even an electronically controlled mechanism.

The physical shape of the device may be designed to be any shape desired.

The devices will be connected to the main drip line hose with T-connectors that also convert the drip line hose diameter to ¾" to mate with the device. Such hardware is readily available off the shelf.

The flow rate for each device can be independently set, as can the number of active output ports, providing significant flexibility in the amount of water and the watering locations at each plant.

The value proposition in the proposed solution over the current approach is that it allows nearly limitless flexibility in the amount of water that can be delivered to each plant in a drip system. This results in better plant health and longevity and protects the owners' investment as well as conserves water which is a scarce resource in many locations.

The device may reduce warrantee costs for landscape installers and is simple and quick to install in both new installations and existing systems. It is easy to adjust watering after initial installation and eliminates addition and removal of traditional drip emitters as watering needs change over time The device makes it straightforward to replace and add new plants with time-varying watering requirements and enables muti-phase drip system landscaping to spread owner investment out over time. It enables easy landscape modification over time and enables flexibility of what is planted in gardens and greenhouses.

It is also easily serviced and maintained (it is above ground) compared to traditional emitters which can be buried. It enables potential future services for landscape providers.

The illustrations of embodiments described herein are intended to provide a general understanding of the structure of various embodiments, and they are not intended to serve as a complete description of all the elements and features of apparatus and systems that might make use of the structures described herein. Other embodiments may be utilized and derived therefrom, such that structural and logical substitutions and changes may be made without departing from the scope of this disclosure.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Therefore, it is intended that the disclosure not be limited to the particular embodiment(s) disclosed.

Figures are also merely representational and may not be drawn to scale. Certain proportions thereof may be exaggerated, while others may be minimized. Accordingly, the specification and drawings are to be regarded in an illustrative rather than a restrictive sense.

What is claimed is:

1. A programmable drip irrigation emitter device, comprising:

an input port;

a gathering chamber;

a flow selection knob;

an orifice sized to deliver the desired flow rate of water;

one or more output ports;

an output distribution chamber, wherein the water is splashed against the chamber surface while being redirected and channeled to pass through several diffusor pin arrays used to achieve nearly uniform water flow rate at the output ports; and an external case comprised of a top piece and a bottom piece.

2. The programmable drip irrigation emitter device of claim 1, further comprising a rubber washer for leak prevention in the gathering chamber.

3. The programmable drip irrigation emitter device of claim 1, wherein the top piece and the bottom piece are together with sealing grommets.

4. The programmable drip irrigation emitter device of claim 1, further comprising one or more port selection knobs.

5. The programmable drip irrigation emitter device of claim 4, wherein the output ports are enabled or disabled with the one or more port selection knobs.

6. The programmable drip irrigation emitter device of claim 1, wherein the output ports accommodate ¼" drip tubing.

7. The programmable drip irrigation emitter device of claim 1, wherein the number of output ports is 6.

* * * * *